United States Patent [19]

Nakayashiki et al.

[11] Patent Number: 4,777,330

[45] Date of Patent: Oct. 11, 1988

[54] NETWORK SYSTEM DIAGNOSIS SYSTEM

[75] Inventors: Susumu Nakayashiki, Yokohama; Takeshi Harakawa, Hadano; Yoshinori Bekki, Hadano; Hiroyuki Wada, Hadano; Masahiro Fuse, Hadano; Hiroshi Nakase, Fujisawa; Osamu Ebina, Atsugi; Jiro Kashio, Kawasaki, all of Japan

[73] Assignee: Hitachi, Ltd., Tokyo, Japan

[21] Appl. No.: 104,530

[22] Filed: Oct. 1, 1987

Related U.S. Application Data

[63] Continuation of Ser. No. 828,975, Feb. 13, 1986, abandoned.

[30] Foreign Application Priority Data

Feb. 15, 1985 [JP] Japan ................................ 60-26237
Feb. 15, 1985 [JP] Japan ................................ 60-26238
Mar. 12, 1985 [JP] Japan ................................ 60-48647
Apr. 12, 1985 [JP] Japan ................................ 60-76570

[51] Int. Cl.$^4$ ............................................. H04B 3/46
[52] U.S. Cl. ............................ 178/69 R; 340/823.05; 371/11
[58] Field of Search ............... 178/69 R, 2 C, 2 D; 340/825.05, 825.07; 370/14, 15, 13; 371/22, 11; 375/10

[56] References Cited

U.S. PATENT DOCUMENTS

| 4,417,242 | 11/1983 | Bapst et al. | 340/825.05 |
| 4,510,493 | 4/1985 | Bux et al. | 340/825.05 |
| 4,542,496 | 9/1985 | Takeyama et al. | 340/825.05 X |
| 4,627,055 | 12/1986 | Mori et al. | 371/11 X |

FOREIGN PATENT DOCUMENTS

| 56-112163 | 9/1981 | Japan | 178/69 R |
| 57-135544 | 8/1982 | Japan . | |
| 57-135545 | 8/1982 | Japan . | |
| 57-135546 | 8/1982 | Japan . | |

Primary Examiner—Stafford D. Schreyer
Attorney, Agent, or Firm—Antonelli, Terry & Wands

[57] ABSTRACT

A station diagnosis method in a communications network system including a closed ring transmission line and a plurality of data stations which can be connected to the ring transmission line by a plurality of line concentrators disposed in the ring transmission line wherein an internal ring transmission line is formed in the line concentrators so that the operation states of the line concentrators are diagnosed by transmitting diagnosis data through the internal ring transmission line.

23 Claims, 14 Drawing Sheets

NETWORK SYSTEM DIAGNOSIS SYSTEM

This application is a continuation of application Ser. No. 828,975, filed Feb. 13, 1986, now abandoned.

BACKGROUND OF THE INVENTION

The present invention relates to a network system diagnosis method, and in particular, to a diagnosis method of a star ring network system in which a plurality of line concentrators are connected through a pair of transmission lines in a form of a ring or a loop with signal transmission directions of the lines set to be opposite to each other and a plurality of stations are linked to each line concentrator in a form of a star or in a radial form.

In a ring network system, a plurality of line concentrators are connected via a first transmission line and a second transmission line, the first and second transmission lines having the opposite transmission directions, and a plurality of terminal stations, ST's are linked to each line concentrator. Signal transmission between ST's is ordinarily conducted via the first ring transmission line, namely, the primary transmission line. The second ring transmission line is a subtransmission line to be set as a spare line or a standby line.

In a form of the ring network system, only the plurality of line concentrators are included in the ring transmission lines, and branch lines connecting each station to the respective line concentrator are disposed externally with respect to the ring, thereby preventing a failure transmission through the ring transmission lines. In a recent network system, on the other hand, as described in an article "Local Area Network in Token Ring System" (BIT, Kyoritsu Shuppan Sha, Vol. 16, No. 3, 1984) for example, a plurality of ports are disposed on a first ring transmission line in each line concentrator and a plurality of ST's are linked in a form of a star via branch lines to these ports so as to construct a star ring network. In this configuration, although the line concentrators and all ST's can be advantageously controlled by use of only one ring control protocol, there exists a disadvantage that when a failure occurs in a branch line or an ST associated with a line concentrator, the failure prevents the data transmission of the overall network system.

To prevent this difficulty, each line concentrator is provided with a control ST connected to a position furthest downstream in the first ring transmission line for controlling the configuration of transmission lines so that the control ST separates a failed port (to form a bypass) or establishes/releases a loopback path between two ring transmission lines.

According to "A Token Ring Architecture for Local Area Networks" published in "Contribution of Working Paper to IEEE Project 802 on Local Area Networks, Mar. 8, 1982, each ST constituting a network is provided with an information item (port number) for identifying a location of the ST in a line concentrator to which the ST is connected, and when an ST detects an abnormality of the network, the ST is caused to issue an abnormality notification frame containing the port number. In this case, the other ST's sequentially relay the abnormality notification frame from itself, the ST terminates the operation of the frame transmission. This provision allows only the ST at a location immediately downstream with respect to the failure position to continue issuing the abnormality notification (because the abnormality notification frame cannot be received from an ST placed at an upstream location), and the control ST checks the port number contained in the frame. If the ST issuing the frame is found to be under control of the control ST, a bypass operation is achieved for the pertinent port. If the failure occurrence point is in a branch line of the port or in an ST (first ST) connected thereto, the failure recovery operation is completed with the bypass operation.

In the case described above, if the failure is assumed to have occurred in a ring transmission line between line concentrators, the abnormal state cannot be restored even if the bypassing of the first ST is conducted, and a second ST positioned at a location immediately downstream with respect to the first ST continues sending the abnormality notification frame. The control ST checks the transition of the states before and after the bypass operation, namely, the port number of the port from which the abnormality notification frame has been issued so as to determine that the failure has occurred at a position outside the self-line concentrator, said position being on the upstream side in the first ring transmission line, and therefore restores the bypass port to the original state and establishes a loopback path between an output terminal of the second ring transmission line and an input terminal of the first ring transmission line. In this case, the second ring transmission line is interrupted; consequently, a control ST of a line concentrator adjacent to the failure position on the downstream side in the second transmission line (i.e. on the upstream side in the first transmission line) effects the failure recovery operation to establish a loopback line between the output terminal of the first ring transmission line and the input terminal of the second ring transmission line, thereby constructing a transmission pass bypassing the failure point. The method for notifying the port number to each port has been described, for example, in the Japanese Patent Unexamined Publication No. 58-117750 (corresponding to U.S. Pat. No. 4,510,493).

However, in the prior art abnormality diagnosis method described above, if another failure occurs on the input side of the second ST in the line concentrator after the failure of the ring transmission line for example, the control ST receives an abnormality notification frame from the second ST and thus initiates an operation to establish the loopback path, which causes the bypass operation of the failure position in the line concentrator to be delayed. Similarly, when a failure occurs in a branch line on the output side of an ST, an ST at a location downstream with respect to the ST and adjacent thereto and an ST next to the downstream ST are considered to correspond to the first and second ST's, respectively. Under this condition, the bypass operation is executed by the control ST as described above. As a consequence, the bypass operation of the ST on which the failure has actually occurred is delayed.

In addition, since this abnormality diagnosis method is implemented under conditions that each ST has an information of a port number for its connection and issues a frame containing the port number when an abnormality is detected, this method is not suitable for a network allowing ST's to be arbitrarily assigned to free ports of a line concentrator.

Other prior art techniques have been described, for example, in the Japanese Patent Unexamined Publication Nos. 57-135544, 57-135545, and 57-135546 in which an internal ST of each line concentrator issues a diagnosis frame to the spare line, namely, the second ring transmission line and the state of self-concentrator is diagnosed by receiving the diagnosis frame. However, these publications have not considered a case in which a failure occurs on the second ring transmission line, which disables an internal diagnosis of a line concentration when an abnormality is present on the second ring transmission line.

SUMMARY OF THE INVENTION

It is therefore an object of the present invention to provide a diagnosis method of a star ring network system in which an internal condition of each line concentrator can be diagnosed independently of whether the pair of ring transmission lines are normal or abnormal.

Another object of the present invention is to provide a diagnosis method in a star ring network system in which a location of a failure in each line concentrator can be appropriately determined and separated.

Still another object of the present invention is to provide a diagnosis method in a star ring network system in which even when failures occur duplicatedly, the location of each failure can be properly separated.

To achieve the foregoing objectives according to the present invention, each line concentrator is associated with an internal ring independently of the other line concentrators, the internal ring containing a plurality of ports to which data stations are to be connected, thereby effecting the diagnosis operation for detecting a failure location in the internal ring.

In accordance with the present invention, there is provided a diagnosis method for diagnosing failures in a ring network system including a plurality of line concentrators connected by a first ring transmission line and a second ring transmission line with transmission directions opposite to each other, each said line concentrator having a plurality of data stations connected via branch lines to said first ring transmission line and control means for controlling connections between said first ring transmission lines and said branch lines, wherein said diagnosis method is characterized by comprising a first step for inspecting a failure location in a state in which an internal ring containing a plurality of data stations is established in each line concentrator, said internal ring being independent of the other line concentrators and a second step operative in a state in which a branch line including a failure location detected is bypassed for releasing the internal ring of said each line concentrator and for connecting said internal ring to the other line concentrators.

According to the present invention, the failure analysis in a line concentrator can be achieved completely independently of that of a ring transmission line.

Consequently, another aspect of the present invention is characterized by including the following steps between said first and second steps, namely, a third step operative in a state in which all data stations on said internal ring are bypassed for connecting said each line concentrator to the other line concentrators, thereby checking to determine whether a failure is present or not and a fourth step operative when a failure is detected in said first ring transmission line for establishing a loopback line which connects said first and second ring transmission lines at two line concentrators adjacent to the failure location, respectively.

BRIEF DESCRIPTION OF THE DRAWINGS

The foregoing and other objects, advantages, manner of operation and novel feature of the present invention will be understood from the following detailed description when read in connection with the accompanying drawings in which.

DESCRIPTION OF THE PREFERRED EMBODIMENTS

Figure 1:
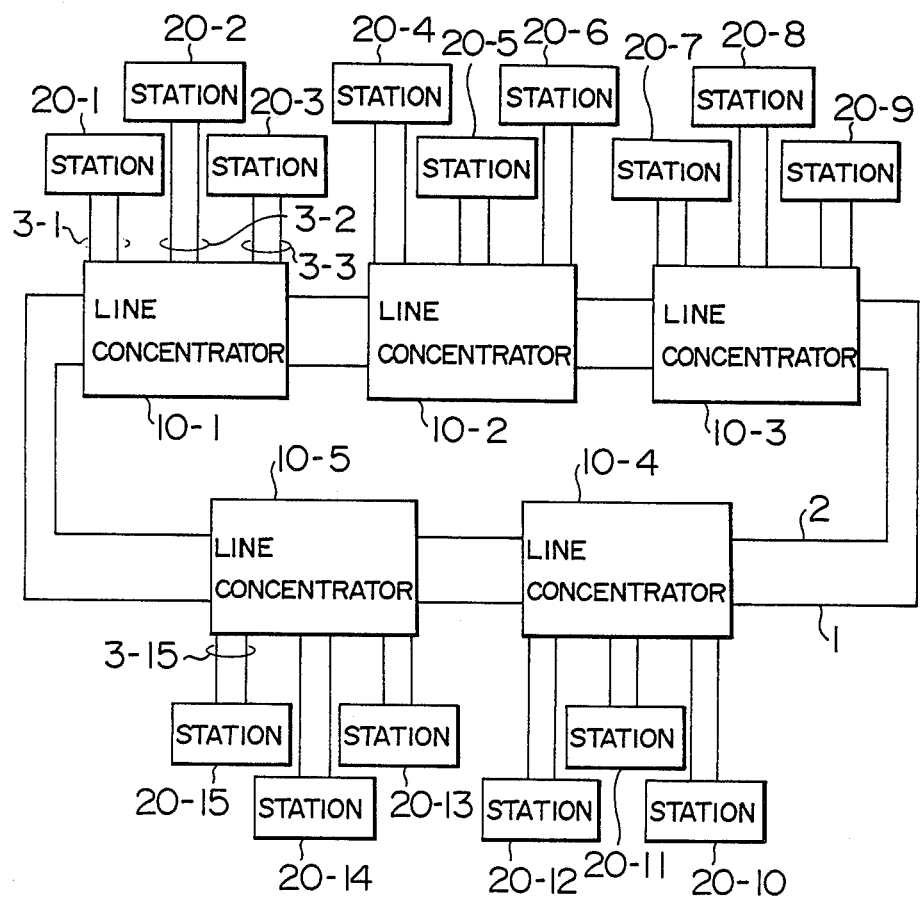
FIG. 1 is a schematic block diagram illustrating the overall configuration of a ring network system to which the diagnosis method of the present invention is applied.

Referring now to FIG. 1, there is shown a diagram of the overall configuration of a communications network for which the diagnosis is conducted according to the present invention. A main ring (first) transmission line 1 and a sub ring (second) transmission line 2 comprise, for example, coaxial cables for connecting line concentrators 10-1, 10-2, . . . , 10-5 distributed to a plurality of rooms or buildings in a facility such as a factory or a research institute. Each line concentrator is connected via ports 3-1, 3-2, . . . , 3-15 and branch lines to data terminals 20-1, 20-2, . . . , 20-15 which are used as stations. In this configuration, a station may comprise at least one of various electronic devices including a display unit, microcomputer, a data gathering unit, and a telephone terminal equipment. The communication system has a function to exchange data between these stations or to enable a station to distribute data to a plurality of other stations.

Figure 2:
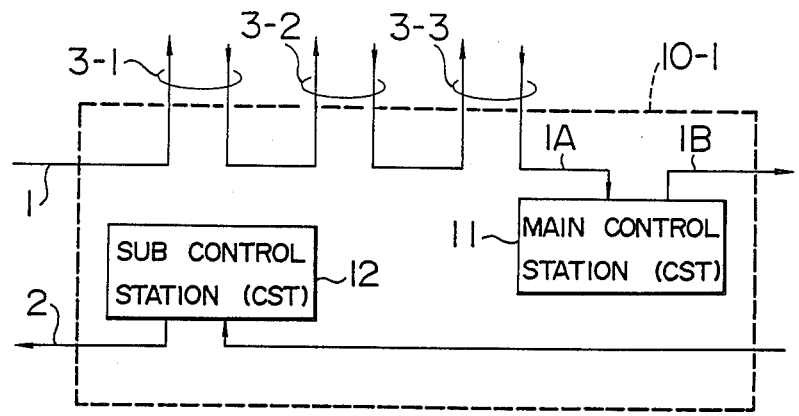
FIG. 2 is a diagram illustrating relationships among control stations (CST's), ring transmission lines, and ports in a line concentrator.
Figure 4:
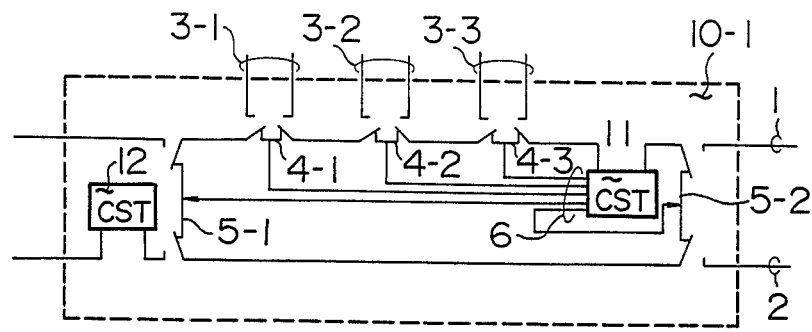
FIG. 4 is a diagram depicting a state of an internal ring formed to diagnose a main CST.
Figure 5:
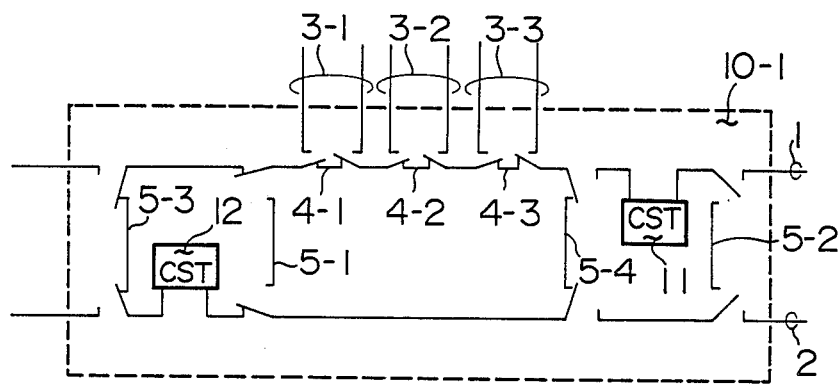
FIG. 5 is a diagram depicting a state of an internal ring formed to diagnose a sub-CST.

FIG. 2 is a diagram illustrating a configuration of the line concentrator 10-1 in which switches and the other components necessary for network reconfiguration described later in conjunction with FIGS. 4 and 5 are omitted for the simplicity of the diagram, namely, relationships between the state of transmission lines and control stations (CST's) in the line concentrator. The line concentrator has a main CST 11 at a downstream position of a first transmission line including a plurality of ports 3-1, 3-2, and 3-3 and a sub-CST 12 connected to a second transmission line 2.

A detailed configuration of a port connecting a station to the communication ring and a method for connecting a port to a line concentrator have been described, for example, in the Japanese Patent Unexamined Publication Nos. 58-1177 and 57-160244.

The main CST 11 and the sub-CST 12 are used, when a failure occurs in the network, to achieve a network configuration control for establishing a loopback path between the ring transmission lines 1 and 2, for bypassing the failure port, and/or for accomplishing other operations. The main CST 11 effects the failure recovery operation primarily on the first transmission line 11, whereas the sub-CST 12 executes the recovery operation mainly for failures occurred on the second transmission line 12.

Figure 3:
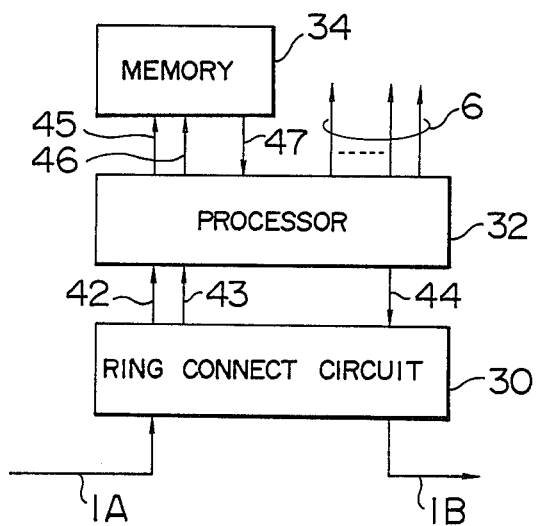
FIG. 3 is a block diagram depicting an outline of a configuration of CST.

FIG. 3 is a block diagram illustrating a configuration of the CST 11. The CST 12 has basically the same configuration as shown in FIG. 3. The CST 11 comprises a ring connect circuit 30, a data processor 32, and a memory unit 34.

The ring connect circuit 30 performs a predetermined signal conversion processing on data received from the ring transmission line 1 (1A) and data to be transmitted to the ring transmission line 1 (1B); moreover, it extracts a timing signal from the received data to synchronize the sent data and receive data by use of the timing signal. The receive data from the ring transmission line is inputted via a signal bus line 42 to the processor 32. Data to be sent to the ring transmission line is supplied from the processor 32 to the ring connect circuit 30 through a signal bus line 44. A signal line 43 is used to send a timing signal to synchronize the data transfer operation. The processor 32 connected to the memory unit 34 via data lines 45 and 47 and a signal line 46 transferring control signals such as address, Read, and Write signals identifies among the receive data items transmission frames directed to the processor 32 to store the transmission frames in the memory unit 34, or it reads stored transmission frames from the memory unit 34 and sends them to the ring transmission line. Furthermore, the processor 32 recognizes the internal state of a line concentrator according to an analysis program to be described later so as to generate switch control signals 6 for the purpose of network reconfiguration and failure port bypassing. If the memory unit 34 is shared among the processor 32 and other data processing terminals, the CST 11 may be further provided with other functions so that the processor 32 communicates through the ring transmission line the send/receive data of the data processing terminals via the memory unit 34.

According to the present invention as shown in FIGS. 4 and 5, each line concentrator is provided with switches 4-1, 4-2, and 4-3 for the auto bypassing operation and switches 5-1, 5-2, 5-3, and 5-4 for establishing a closed internal ring in the line concentrator. Each switch is actuated to be opened or closed by the control signal 6 from the CST.

Among these switches, switches 5-1 and 5-4 have been added as new features for the internal diagnosis. Switches 5-2 and 5-3 have been adopted also in each line concentrator of the prior art system for establishing a loopback path.

FIG. 4 is a diagram illustrating a state in which an internal ring including the main CST 11 is established, whereas FIG. 5 is a diagram depicting a state in which an internal ring including the sub-CST 12 is formed. For the simplicity of the diagram, switches 5-3 and 5-4 are omitted in FIG. 4, while the control signal 6 is omitted in FIG. 5.

By establishing these internal rings, various diagnoses in a line concentrator become possible.

The first diagnosis according to the present invention is a check for the send/receive function of the CST itself and for a signal transmission line in a line concentrator. In this diagnosis, it is essential to bypass all ports 3-1, 3-2, and 3-3 and to include only one CST in the internal ring, that is, when diagnosing the main CST 11, the sub-CST 12 is separated as shown in FIG. 4, and when diagnosing the sub-CST 12, the main CST 11 is separated. This allows the function of each CST to be checked by removing the effect from failure in a port or the other CST.

Normality of the internal ring and the function of the CST 11 or 12 can be examined by transmitting a diagnosis transmission frame to the internal ring established.

Figure 6:
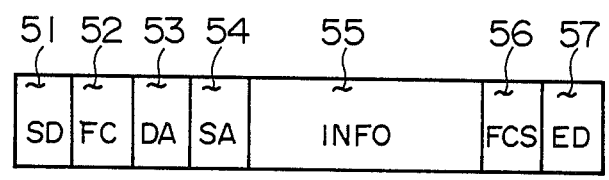
FIG. 6 is a diagram illustrating an example of the format of signal frame transmitted through a ring transmission line.

FIG. 6 is a diagram illustrating the basic structure of a transmission frame. The normality of the operation achieved by a station can be diagnosed by use of a frame, or by a special data pattern other than such a frame. In this embodiment, a transmission frame is assumed to be used for this purpose. The configuration of FIG. 6 comprises a Start Delimiter (SD) 51 indicating the beginning of frame, a Frame Control (FC) 52 representing the type of frame, a Destination Address (DA) 53 denoting a destination address, a Source Address (SA) 54 indicating the address of source station, an Information (INFO) 55, a Frame Check Sequence (FCS) 56, and an End Delimiter (ED) 57 representing the end of frame. A diagnosis frame for diagnosing a control station, CST can be set as follows with the FC 52 assumed to include one byte.

Figure 7:
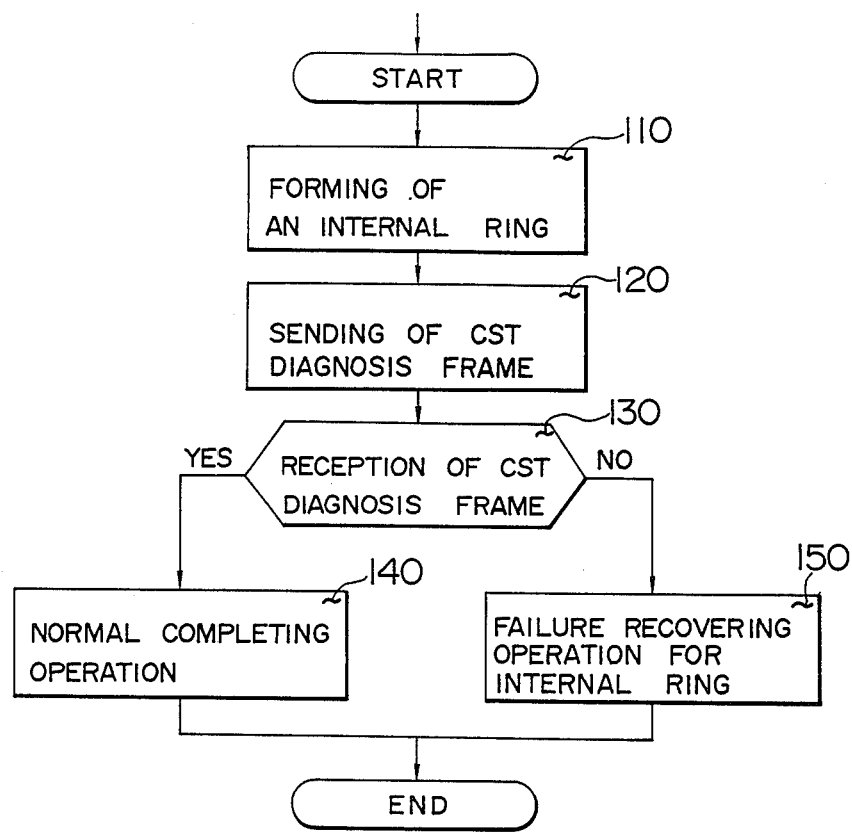
FIG. 7 is a flowchart illustrating a control procedure for diagnosing a CST.

B "01000011" (diagnosis frame indication)
DA 53: Self-station address
SA 54: Self-station address
INFO 55: Diagnosis data FIG. 7 is a flowchart illustrating a control procedure for diagnosis operations in a line concentrator, specifically, for a CST. In this diagnosis, a control signal 6 is outputted in step 110 to operate the switches 4-1, 4-2, 4-3, 5-1, and 5-2, thereby forming an internal ring as shown in FIG. 4. In the next step 120, the diagnosis frame described above is transmitted and is circulated through the internal ring. In step 130, the system awaits an event that the circulated frame is received by the CST 11. When the diagnosis frame is normally receives, step 140 is executed and the send/receive function and the switch control function of the CST 11 are determined to be normal; consequently, the control signal 6 is outputted to restore the switches 4-1 to 4-5 and the ordinary communications network is formed, then operations with other stations are initiated. On the other hand, if the diagnosis frame is not normally received, the program proceeds to step 150 to achieve a failure recovery operation. If the CST 11 has a backup unit, the CST 11 is automatically replaced with the backup unit;

otherwise, the entire communication function of the pertinent line concentrator is stopped and the abnormality is displayed on an abnormality warning device (not shown), thereby waiting for recovery operations by a maintenance engineer.

Diagnosis of the sub-CST 12 is achieved by establishing an internal ring in a line concentrator as shown in FIG. 5. In this case, an instruction to start the diagnosis operation on the sub-CST 12 need only be issued to the CST 12 after the network is restored to the normal state in the step 140 effecting the diagnosis operation on the main CST 11. If the control of each switch for establishing the internal ring is allowed to be achieved by the CST's 11 and 12 independently of each other, the sub-CST 12 can diagnose it send/receive and switch control functions according to the control procedure of FIG. 7 in the same manner as the main CST 11. The functions of the CST's 11-12 controlling the state of each line concentrator are thus diagnosed and are confirmed to be normal; thereafter, the line concentrators are put to operations, which guarantees the data transmission through the network and the bypass operation for bypassing the failure position.

Figure 8:
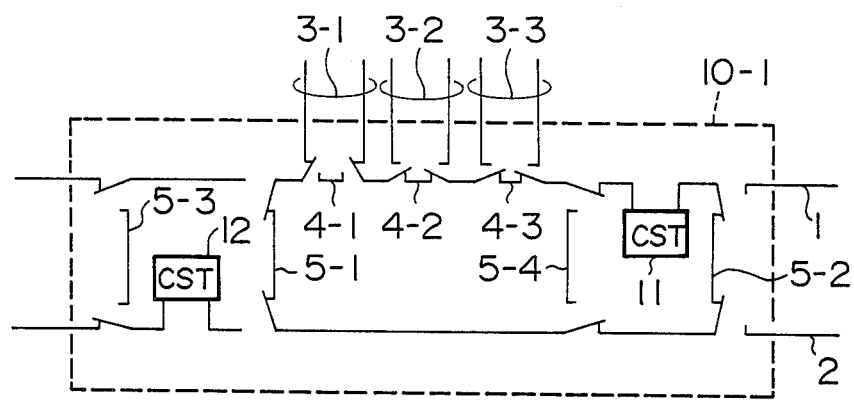
FIG. 8 is a diagram depicting a state of an internal ring in an embodiment for the port diagnosis.

Next, referring to FIGS. 8 and 9, an embodiment will be described in which the CST 11 carries out the failure restore operation on one of the ports 3-1 to 3-3 in a line concentrator by use of an internal ring. In this embodiment, the CST 11 connects or disconnects ports to the formed internal ring according to the predetermined rules, and transmits test data. Based on a state obtained as a result of an operation to receive the test data, the CST 11 detects the failure port and conducts a bypassing operation. In this case, the switches 4-1 to 4-3 are controlled so that each switch is associated in turn with a port as shown in FIG. 8, thereby conducting the analysis for each port. If a plurality of ports are connected to the internal ring at the same time or if the ports are successively added to the internal ring for the diagnosis, the failure port cannot be easily detected. This is clear from that the ring network is a serial data transmission system and the communication function of the overall system is therefore disabled when a failure occurs at a position on the ring.

According to the present invenion, when the test data is received, the pertinent port is regarded as normal; when it is not received, the port is assumed to be abnormal. The resultant condition is stored in a memory and the diagnosis proceeds to the next port. The transmission frame of FIG. 6 is used as the test data. To discriminate the test frame from the other frames, the content of FC 52 is set as follows, for example.

FC 52: B '01000010'

Figure 9:
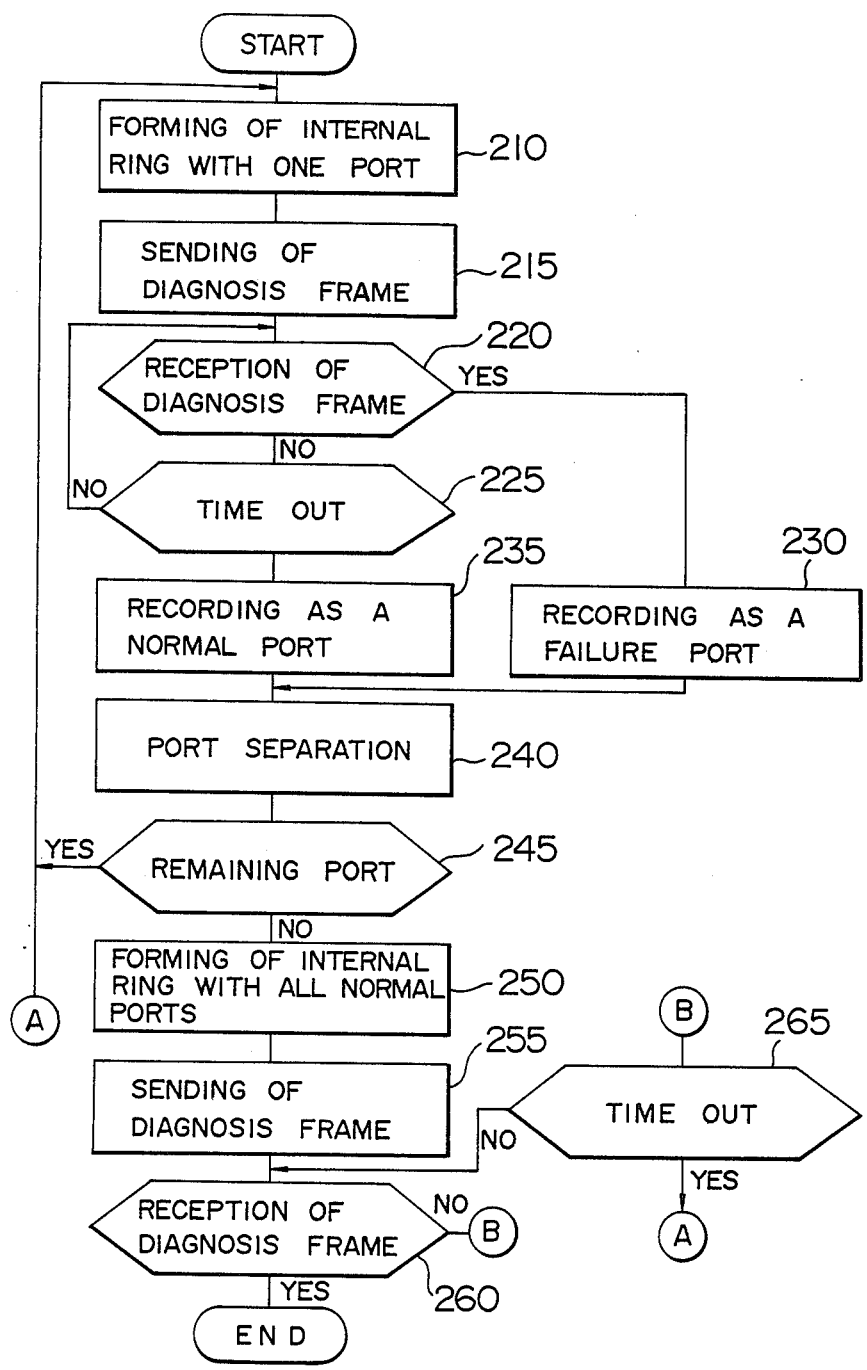
FIG. 9 is a flowchart illustrating an example of a control procedure for diagnosing ports.

FIG. 9 is a flowchart illustrating a control procedure of the CST 11 in the diagnosis operation.

In Step 210, a switch control signal 6 is first outputted to form an internal ring including a port. Next, a diagnosis frame is transmitted in step 215, then the frame receive state is checked in steps 220 and 225. If the diagnosis frame cannot be received within a predetermined period of time, the program proceeds to step 230, which stores in a memory an information that the port is abnormal. If the frame is normally received, step 235 is executed to memorize the port as a normal port. Step 240 separates the port diagnosed and step 245 checks to determine whether a port to be diagnosed is existing or not. If this is the case, control returns to the step 210 to achieve the operations described above for the port at the next position; otherwise, step 250 is executed to connect to the internal ring all the ports judged to be normal, then step 255 is performed to transmit the last diagnosis frame. Steps 260 and 265 monitor the frame receive state. If the frame cannot be received within a predetermined period of time, the diagnosis is conducted again beginning from the step 210. If the frame is normally received, the diagnosis operation is terminated. An advantage of this diagnosis operation is that the port number of each ST to determine whether or not the port associated with the ST is normal. In FIG. 9, a step for releasing the internal ring to connect the line concentrators to the ring transmission path is omitted. This is because the port diagnosis routine is assumed to be effected in combination with another diagnosis control.

Next, referring to FIGS. 10-12, a diagnosis method utilizing the function of the CST 11 to form an internal ring as described above will be described in which when an abnormality occurs during an operation of the network, a clear identification is possible whether the abnormality has occurred in a line concentrator or in a ring transmission line disposed externally with respect to the line concentrator.

When an abnormality occurs in the ring network, an ST that has detected the abnormality issues an abnormality notification frame. The abnormality notification frame (to be referred to as Beacon herebelow) can be identified depending on the content of FC 52 of FIG. 6. The Beacon has a DA 53 containing a broadcast address to all ST's and an INFO 55 including data of abnormality condition. The content of INFO 55 may comprise a timing signal abnormality information and a line concentration identification and a port number associated with the ST issuing the frame. Based on these information items, a CST receiving the frame can determine whether or not the ST is under control of the CST.

In accordance with the present invention, when the CST 11 receives the Beacon and recognizes an abnormality of the network, it forms an internal ring and performs a diagnosis operation only within the line concentrator; furthermore, it separates all ports and conducts a diagnosis operation on the ring transmission line including only CST's, thereby achieving the network diagnosis. When the Beacon is received, each ST relays this frame. If an ST is transmitting a Beacon by itself, it operates to stop the Beacon transmission at this point; consequently, only the ST adjacent to the failure position is sending the Beacon when a predetermined period of time is elapsed. This condition can be detected by the CST 11 of each line concentrator. Since failures may occur duplicatedly, the CST 11 of each line concentrator performs the failure recovery operation in the own unit independently of each other to prevent a plurality of failures from interfering with each other. If the failure exists in the own line concentrator, the CST 11 separates the failure position, executes all necessary failure restore operations, then reconfigures the network.

Figure 10:
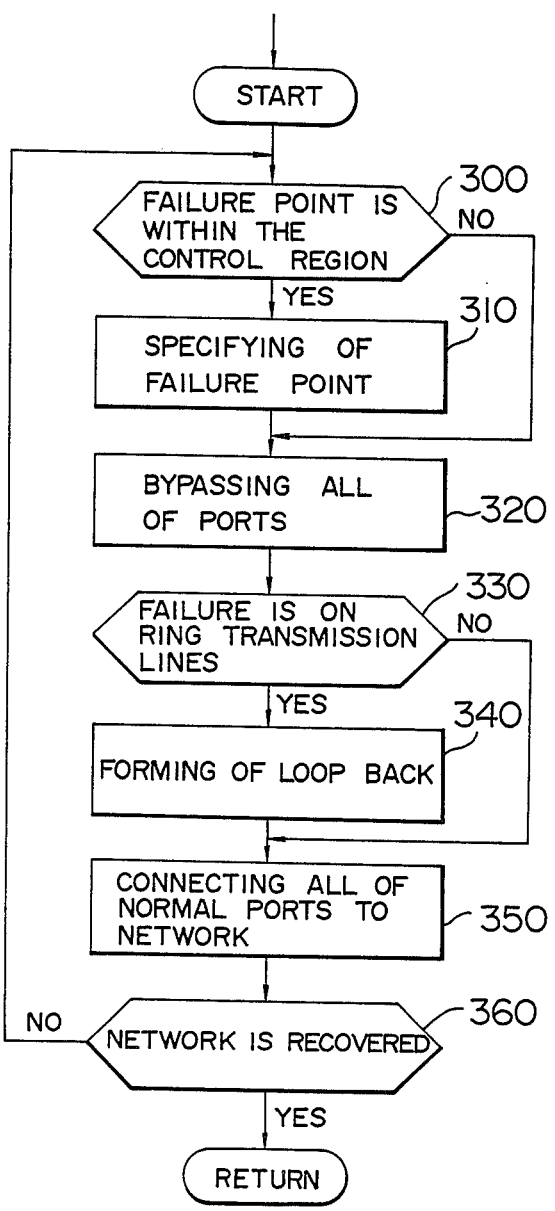
FIG. 10 is a flowchart illustrating another embodiment of a control procedure for detecting a failure location.
Figure 11:
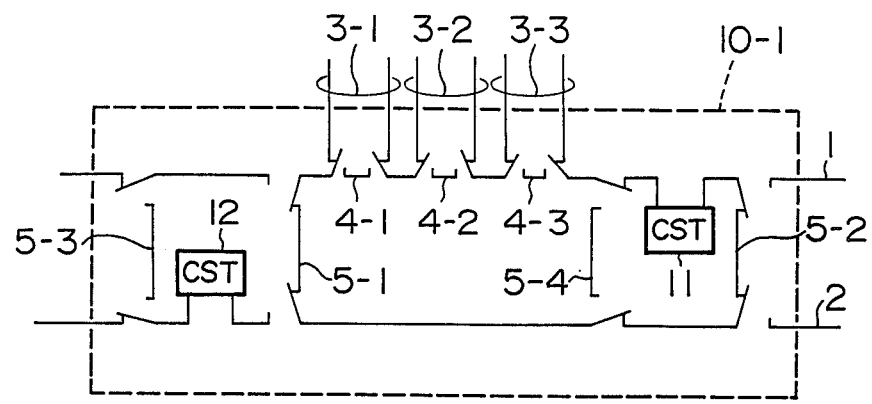
FIGS. 11–12 are diagrams showing states of the line concentrator associated with FIG. 10.

FIG. 10 is a flowchart illustrating a control procedure of each CST 11 for accomplishing the diagnosis operation described above.

On receiving a Beacon indicating an abnormality, the CST performs a check in step 300 to determine whether or not the ST that has issued the Beacon belongs to a line concentrator under control of the CST. If this is the case, step 310 is executed to initiate an operation for determining a failure position. This is achieved by issuing the control signal 6 to operate the switches 5-1 and 5-2 so that an internal ring is established as shown in FIG. 11. With the internal ring formed, the diagnosis is conducted in a state in which effect from failure outside the line concentrator is prevented, which facilitates the determination of the failure position. To determine the failure position, test data is transmitted in the state of FIG. 1, for example. If the test data cannot be received, the ST that has issued the Beacon is bypassed, and thereafter the test data is circulated again. The diagnosis method described in connection with FIG. 9 may also be adopted for this purpose. If the failure position is defined as a result of the diagnosis, the position is memorized and bypassed; otherwise, the abnormality is assumed to exist outside the own line concentrator and the processing thus proceeds to step 320.

Figure 12:
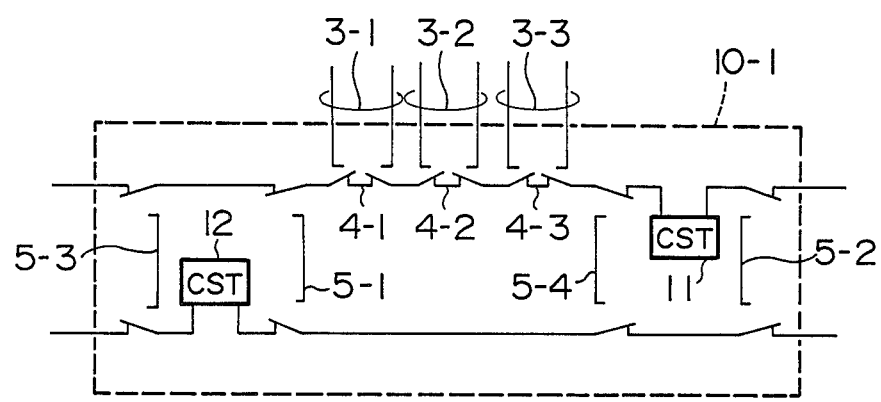

In the step 320, with all ports bypassed as shown in FIG. 12, the line concentrator is linked to the ring transmission lines 1 and 2. The ring transmission lines are then checked for an abnormality in step 330. If an abnormality is found in an adjacent ring transmission line, a loopback path for bypassing the abnormal position is formed in step 340. The forming of the loopback path is achieved by use of the switch 5-2 or 5-3.

When the failure restore operation on the ring transmission line is completed, step 350 is executed to connect all ports other than the failure port to the transmission line. In step 360, the network is checked to determine whether or not it is normal. For the connection of the normal ports to the ring transmission line, each CST is provided with a timer for synchronizing the completion of the failure restore operation on the ring transmission line, for example. The port connection is simultaneously initiated when a time-out of the timer occurs. The result of the check of step 360 can be determined depending on whether or not the predetermined frame issued by each ST is received after it is circulated through the network. If an abnormality is detected, the diagnosis operation is repeated beginning from the step 300. According to the diagnosis procedure, even if another abnormality occurs in a port of a line concentrator when the failure restore operation is being executed on the ring transmission line, the abnormality does not affect the diagnosis of the ring transmission line. An abnormality of the network is detected by the check effected in the step 360, whereas the new abnormal position described above is appropriately detected by the second diagnosis operation.

Figure 13:
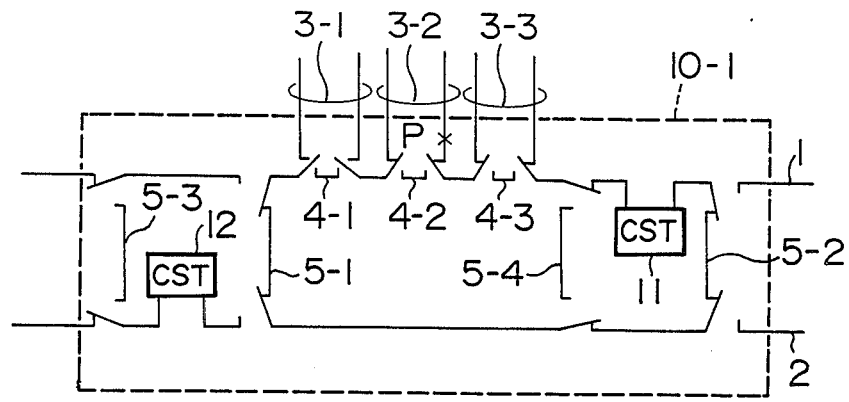
FIG. 13 is a diagram showing states of a line concentrator for explaining another embodiment to detect a failure location.
Figure 14:
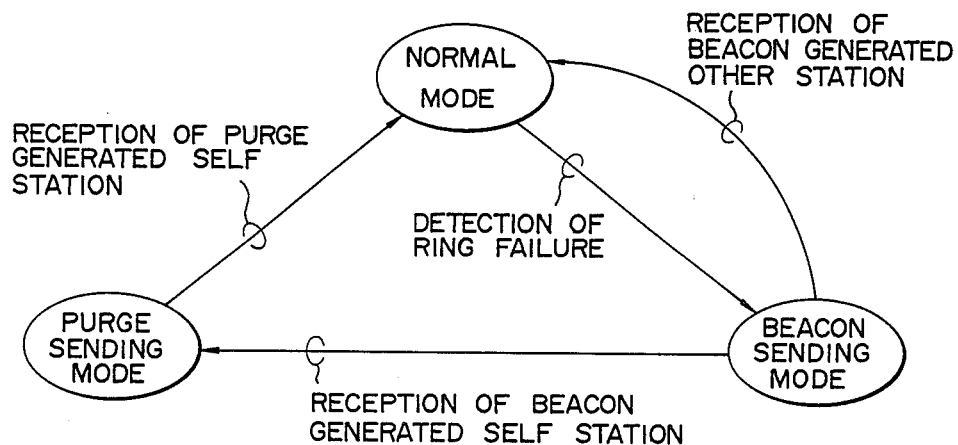
FIG. 14 is a diagram for explaining the operation mode transition of each station.
Figure 15:
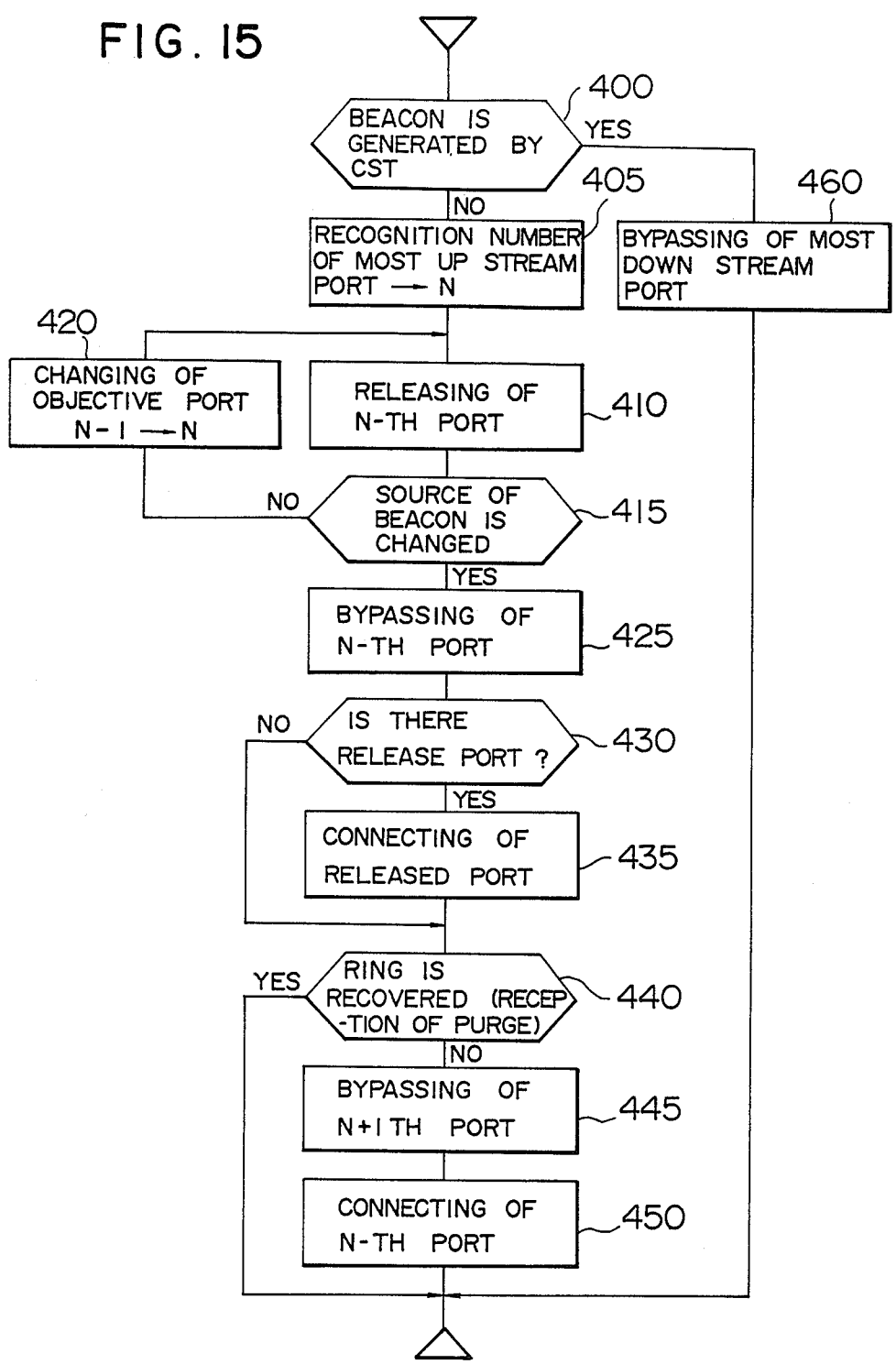
FIG. 15 is a flowchart illustrating a control procedure for detecting a failure location related to FIG. 13.

Referring now to FIGS. 13, 14 and 15, another embodiment suitable for the determination of a failure port achieved in the step 310 of FIG. 10 will be described.

In this embodiment, to determine the failure position in the line concentrator, the CST 11 causes a pseudo failure on purpose by use of the switches 4-1 to 4-3 provided to bypass ports so that the actual failure is specified according to the status change developed when the pseudo failure position is sequentially shifted.

In the ring network as has been well known, when an ST detects a ring abnormality, each ST is set to a mode to transmit a Beacon. On receiving a Beacon from another ST located at an upstream position, the ST that has received the Beacon recognizes that a failure has occurred at a location upstream with respect to the adjacent ST and returns to the normal mode. If an ST can receive the Beacon transmitted therefrom, it assumes that the failure has been restored or the failure position has been bypassed and enters the Purge sending mode in which a Purge signal is transmitted for a predetermined period of time to remove the Beacon from the ring. Thereafter, the ST returns to the normal mode. Relationships between these modes are shown in FIG. 14.

For example, assume that a failure occurs in a branch line on the output side of the port 3-2 under control of the line concentrator 10-1 as marked by P in FIG. 13. When a predetermined period of time is elapsed, only the ST 20-3 (FIG. 1) connected to the adjacent port 3-3 in the Beacon sending mode. In this case according to the present invention, the CST 11 in the line concentrator 10-1 forms the internal ring of FIG. 11 and releases the ports beginning from the port 3-1 at the most upstream position as shown in FIG. 13. The word "release" here is different in the meaning from "connection" or "bypassing" of a port but it indicates a switch state in which the internal ring is disconnected at the pertinent port.

FIG. 15 is a flowchart illustrating a diagnosis control procedure including such a port release step.

If the CST 11 is not in the Beacon sending mode (step 400), it release the most upstream port of the internal ring (step 401) and checks to determine whether or not the device issuing the Beacon is changed. If the device remains unchanged, the CST 11 sequentially releases the next port to check for the change (steps 420, 410, and 415). In the example of FIG. 13, when the third port is released, the Beacon sending device is changed. Although the Beacon sending device is the CST 11 in this example, the device should be shifted to the next position if there exist a greater number of ports. When the Beacon sending source is changed, the port 3-3 just released is bypassed (step 425). If there are any ports in the released state, the CST 11 restores these ports to the normal connection state (steps 430 and 435) and checks to determine whether or not the purge mode is set (step 400).

For example, if a failure occurs at a position of a branch line on the input side of the port 3-3 which has been bypassed, the abnormality of the ring is restored; however, the failure of FIG. 13 cannot be restored because it has occurred at the point P. In this case, the CST 11 recognizes that a port adjacent to and preceding the port 3-3 is abnormal, and hence it bypasses the port 3-3 and restores the port 3-3 to the normal connection state (steps 445 and 450). The failure position is thus bypassed. Although the pseudo failure is caused in the internal ring beginning from the most upstream position in the embodiment; if the Beacon sending source is known, the port release control may be achieved beginning from the port located at a position next to the port of the Beacon sending device.

According to the diagnosis method, the abnormal port can be determined without notifying the port number to the ST; consequently, this method is suitable for a network in which ST's are frequently mounted or demounted.

Referring to FIGS. 16 to 21, the following paragraphs describe another embodiment of the present invention in which at an occurrence of a port failure that disables data transmission through a ring transmission line, the port is automatically bypassed to guarantee a normal ring transmission line.

Figure 16:
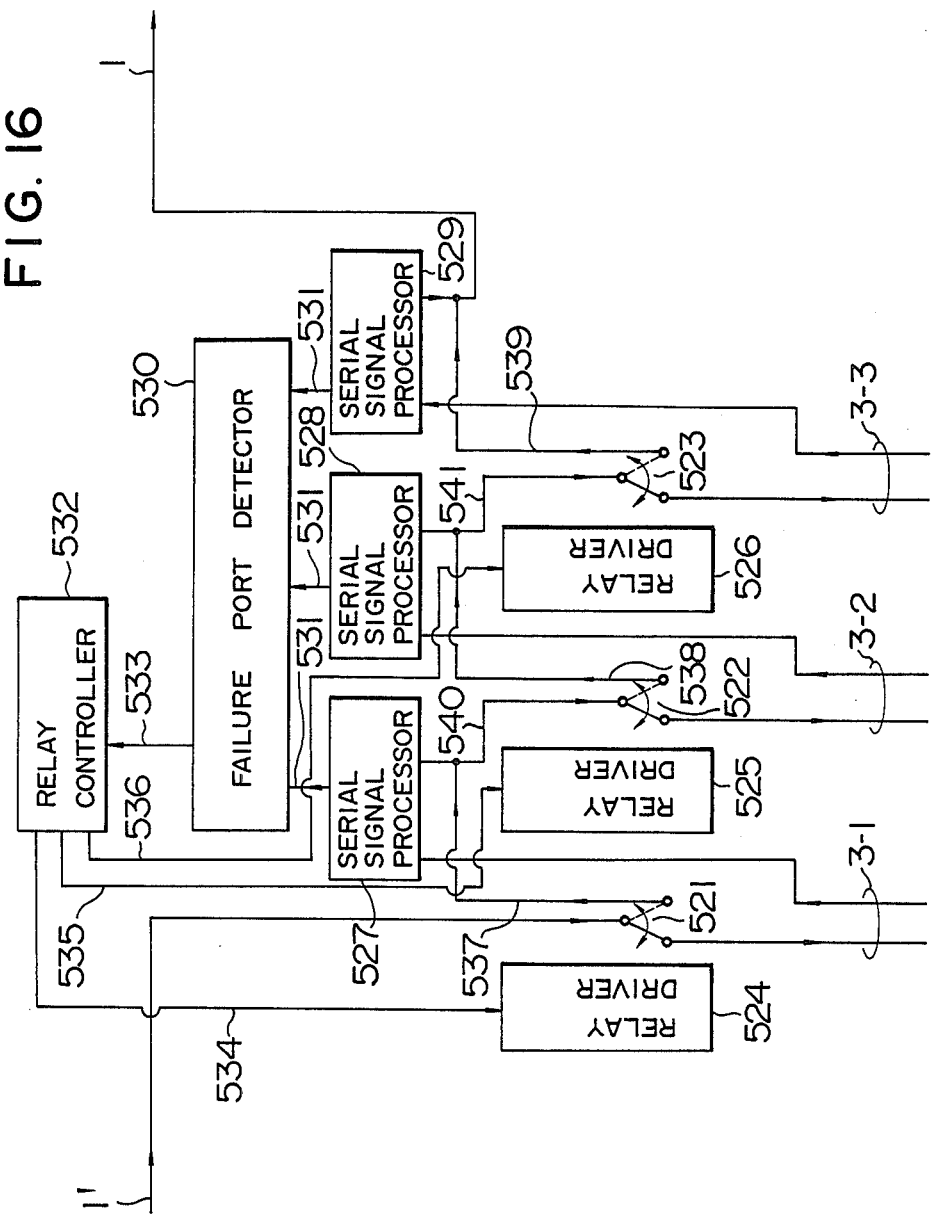
FIG. 16 is a control circuit diagram illustrating another embodiment for bypassing a failure port.

In this example, each line controller comprises as port bypass means replacing the CST, as shown in FIG. 16, relay switches 521–523, relay drive circuits 524 to 526, serial signal processing sections 527 to 529, a failure port detect section 530, a line 531 connecting the serial signal processors 527 to 529 and the failure port detector 530, a relay control section 532, a failure branch line number report line 533, relay drive lines 534 to 536, failure port bypass transmission lines 537 to 539, and transmission lines 540 and 541 between the serial signal processors 527 to 529 and the relay switches 521 and 523.

The relay switches 521 and 523 are driven by the relay drive circuits 524 to 526, respectively to bypass branch lines 3-1 to 3-3, respectively. The serial signal processors 527 to 529 are serially connected to the ranch lines 3-1 to 3-3 via the relay switches 521-523, respectively, and they each decode timing information and input signals supplied from the respective input ports to detect a control frame. If the control frame is not detected by any one of the processors 527 to 529, a failure is notified via the connect line 531 to the failure port detector 530. The control frame is a token frame in the token system, whereas it is a time slot synchronous frame in the time division system.

The failure port detector 530 has a function to receive a failure report from the serial signal processors 527 to 529 and to notify the failure port number via the failure port number report line 533 to the relay controller 532. On receiving the failure port number from the failure port detector 530, the relay controller 532 transmit a relay derive signal via the signal line 534, 535, or 536 to the relay drive circuit 524, 525, 526 to switch the output point of the relay switchh circuit 521, 522, or 523 associated with the failure port from the port 3-1, 3-2, or 3-3 to the bypass transmission line 537, 538, or 539. The relay drive circuits 524-526 drive the relay switches 521-523, respectively according to the relay drive signal.

Figure 17:
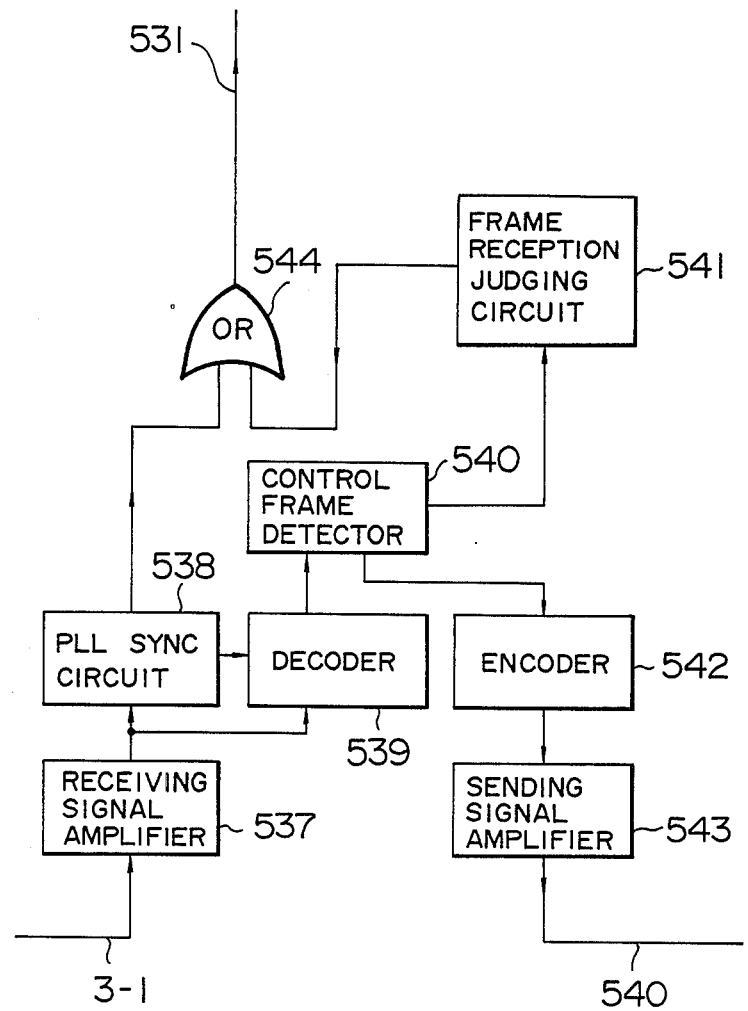
FIG. 17 is a block diagram depicting a detailed configuration of a serial signal processor of FIG. 16.

FIG. 17 is a schematic block diagram illustrating in detail the serial signal processor 527. This also applies to the configuration of the serial signal processors 528 and 529. An input signal inputted from the port 3-1 is amplified by a receiving signal amplifier 537 and is delivered to a PLL SYNC circuit 538 and a decoder 539. The PLL SYNC circuit 538 extracts a timing signal from the input signal. If the timing signal is not detected, it notifies an occurrence of a failure to an OR gate 544. The decoder 539 decodes the signal inputted thereto and transmits the resultant signal to a control frame detector 540. On detecting a control frame, the control frame detector 540 sends a control frame reception signal to a frame reception judging circuit 541. Furthermore, it transmits to an encoder 542 a signal received from the decoder 539. The encoder 542 then encodes the received signal and feeds the resultant signal to a sending signal amplifier 543. The sending signal amplifier 543 amplifies the input signal and delivers the obtained signal to a ring transmission line via a signal line 540. When the circuit 527 does not receive the control signal reception report from the control frame detector 540 for a predetermined period of time, it sends to an OR gate a signal notifying a failure for the predetermined period of time. On receiving a signal from the PLL SYNC circuit 538 or the judging circuit 541, the OR gate 544 outputs a failure occurrence signal to the transmission line 531.

Figure 18:
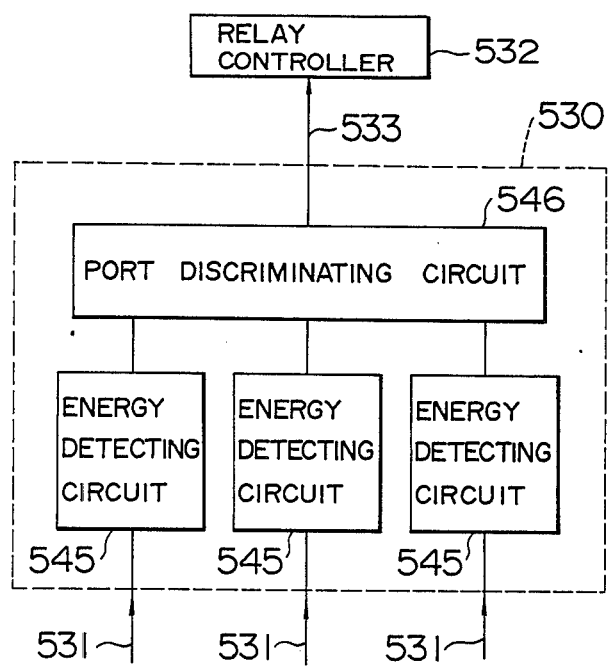
FIG. 18 is a block diagram depicting a detailed configuration of a failure port detector 530 of FIG. 16.

FIG. 18 is a block diagram illustrating in detail the failure port detector 30. Energy detecting circuits 545 are provided corresponding to the ports 3-1 to 3-3. When an input signal from the connect line 531 is received, the associated circuit 545 notifies a port discriminating circuit 546 the condition that the input signal is present. On receiving the input signal presence notification from the energy detecting circuit 545, the port discriminating circuit 546 discriminates a port number associated with the input signal presence notification; moreover, it encodes the port number and reports the failure port number to the relay controller 432 via the failure line report line 533.

Figure 19:
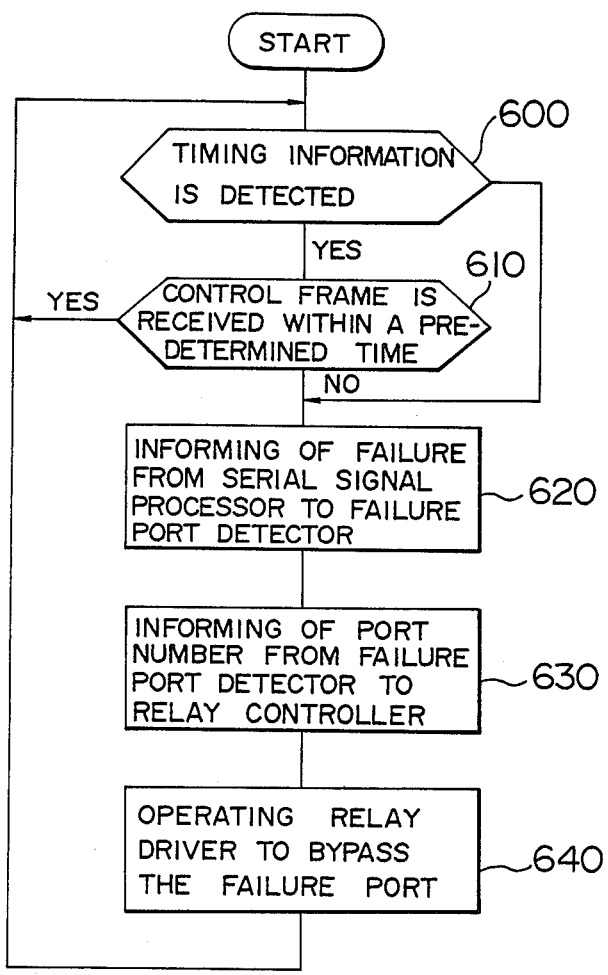
FIG. 19 is a flowchart for explaining operations of a control circuit of FIG. 16.

FIG. 19 is a flowchart for explaining operations of the circuit of FIG. 16.

The serial signal processors 527-529 continue monitoring by use of the respective PLL SYNC circuit 538 whether or not a timing information is detected for a signal inputted from the ports 3-1 to 3-3, respectively (step 600). If the timing information is not detected, the failure is notified via the OR gate 544 to the failure port detector 530 (step 620). If the timing signal is detected, the decoder 539 decodes the input signal to determine whether or not the judging circuit 541 receives within the predetermined period of time the control frame reception through the control frame detector 540 (step 610). If the control frame is not received within the predetermined period of time, the judging circuit 541 notifies the failure to the failure port detector 30 via the OR gate 544 in the similar fashion (step 520). If the control frame is received within the predetermined period of time, the serial signal processors 527-529 each return to the state to monitor whether or not the timing information is present.

When the failure port detector 530 receives a failure report signal from the serial signal processor 527, 528, or 529 through the energy detecting circuit 545, it causes the port discriminating circuit 546 to discriminate the port number for which the input reception report has been received, thereby notifying the failure port number to the relay controller 532 (step 630). The relay controller 532 then drives the relay driving circuit 524, 525, or 526 corresponding to the failure port number so that the failure port is bypassed by use of the relay switch 521, 522, or 523 (step 640).

Figure 20:
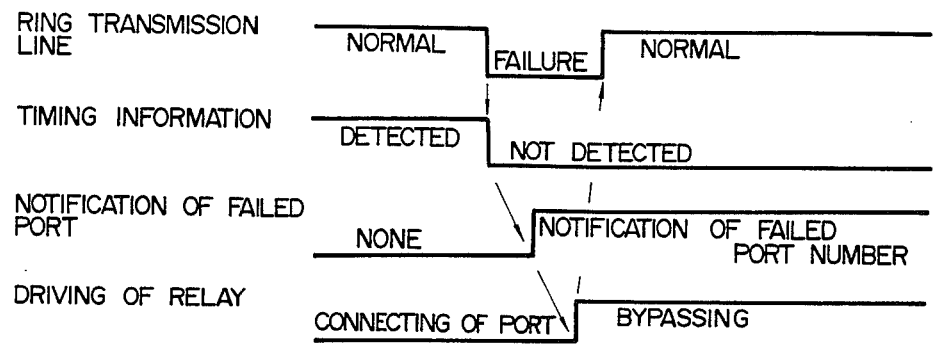
FIGS. 20–21 are signal timing charts for explaining operations of the control circuit of FIG. 16.

FIG. 20 is a timing chart associated with a case in which the timing information is not detected. When this failure occurs in a ring transmission line, the serial signal processor 527, 528, or 529 reports the failure to the failure port detector 530, which then notifies the failure port number to the relay controller 532. The relay controller 532 drives the relay driving circuit 524, 525, or 526 to bypass the failure port, thereby restoring the ring transmission line from the failure state to the normal state.

Figure 21:
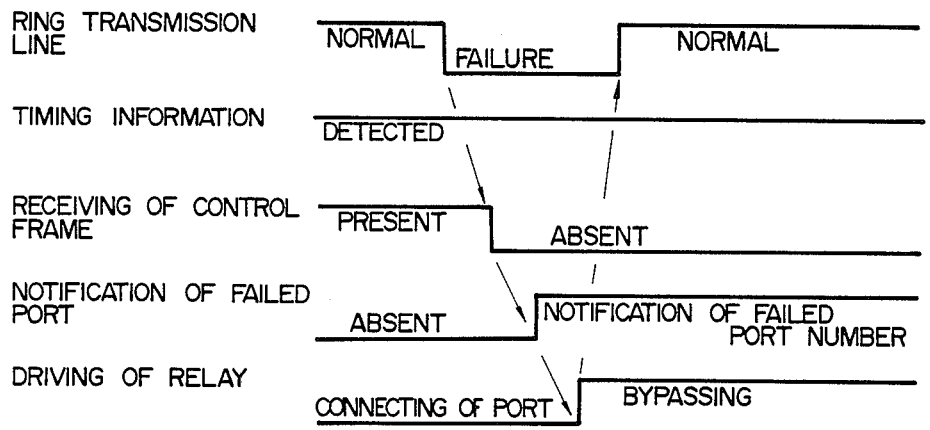

FIG. 21 is a timing chart related to a case in which the control frame is not received within a predetermined period of time. When this failure occurs in a ring transmission line, the serial signal processor 527, 528, or 529 notifies the failure to the failure port detector 530 in the similar fashion. The failure port detector 530 then reports the failure port number to the relay controller 532, which in turn drives the corresponding relay driving circuit 524, 525, or 526 to bypass the failure port, thereby restoring the failed ring transmission line to the normal state.

We claim:

1. A diagnosis method for a network system in which a plurality of concentrators are connected by a first ring transmission line and a second ring transmission line, the first and second ring transmission lines each having a signal transmission direction opposite to each other and each said line concentrator including a plurality of ports for connecting stations, a plurality of first switch means for selectively connecting the ports to the first ring transmission line or selectively bypassing the ports, a plurality of second switching means for short-circuiting the first and second ring transmission lines respectively at input and output portions of the line concentrators, and means for controlling the first and second switch means, said diagnosis method comprising:
- a step responsive to a control signal outputted from the control means of activating the second switch means so as to form an internal ring closed in the line concentrator;
- a step of transmitting a signal for diagnosis from the control means to the internal ring; and
- a step responsive to a receive state of the signal of transmitting a control signal changing a state of the internal ring or releasing the internal ring from the control means to the first or second switch means.

2. A diagnosis method according to claim 1 further comprising a step of supplying the control signal from the control means to each said first switch means to bypass all the ports wherein the signal for diagnosis is transmitted to an internal ring including the control means and not including the other stations.

3. A diagnosis method according to claim 1 further comprising a step of supplying the control signal from the control means to the first switch means so as to connect at a time a port to the internal ring and to bypass the other ports wherein when the signal for analysis cannot completely circulate the internal ring, the port connected to the internal ring is assumed to be a failure port.

4. A diagnosis method according to claim 1 further comprising a step of supplying a signal for setting the internal ring to an interrupted state at a location of the switch from the control means to the first switch means.

5. A diagnosis method according to claim 1, further comprising:
- a step of supplying a control signal from the control means to the first and second switch means so that each line concentrator is connected to the other line concentrators with all the ports being bypassed;
- a step of transmitting a signal for diagnosis to the first ring transmission line in the state of the preceding step; and
- a step of controlling the second switch means in accordance with the receive state of the signal on the first ring transmission line.

6. A diagnosis method according to claim 2, further comprising:
- a step of supplying a control signal from the control means to the first and second switch means so that each line concentrator is connected to the other line concentrators with all the ports being bypassed;
- a step of transmitting a signal for diagnosis to the first ring transmission line in the state of the preceding step; and
- a step of controlling the second switch means in accordance with the receive state of the signal on the first ring transmission line.

7. A diagnosis method according to claim 3, further comprising:
- a step of supplying a control signal from the control means to the first and second switch means so that each line concentrator is connected to the other line concentrators with all the ports being bypassed;
- a step of transmitting a signal for diagnosis to the first ring transmission line in the state of the preceding step; and
- a step of controlling the second switch means in accordance with the receive state of the signal on the first ring transmission line.

8. A diagnosis method according to claim 4, further comprising:
- a step of supplying a control signal from the control means to the first and second switch means so that each line concentrator is connected to the other line concentrators with all the ports being bypassed;
- a step of transmitting a signal for diagnosis to the first ring transmission line in the state of the preceding step; and
- a step of controlling the second switch means in accordance with the receive state of the signal on the first ring transmission line.

9. A failure diagnosis method in a ring network system in which a plurality of line concentrators are connected to a first ring transmission line and a second ring transmission line, the first and second ring transmission lines each having a signal transmission direction opposite to each other and each said line concentrator including a plurality of data stations connected via branch lines to the first ring transmission line and control means for controlling connections between the first ring transmission line and the branch lines, said failure diagnosis method comprising:
- a first of inspecting a failure position in a state in which an internal ring including a plurality of data stations is formed in each line concentrator independently of the other line concentrators; and
- a second step of releasing the internal ring in each line concentrator and for connecting the internal ring to the other line concentrators in a state in which a branch line including a detected failure position is bypassed.

10. A failure diagnosis method according to claim 9 further comprising between the first and second steps:
- a third step of connecting each line concentrator to the other line concentrators to check for a failure in a state in which all data stations of the internal ring are bypassed; and
- a further step effected when a failure is detected on the first ring transmission line in said third step of forming a loopback path connecting the first and second ring transmission lines in two line concentrators each being adjacent to the failure position.

11. A diagnosis method for a network system in which a plurality of concentrators are connected by a first ring transmission line and a second ring transmission line, each said line concentrator including a plurality of ports for connecting stations, a plurality of first switch means for selectively connecting the ports to the first ring transmission line or selectively bypassing the ports, a plurality of second switching means for changing the configuration of the network system, and means for controlling the first and second switch means, said diagnosis method comprising the steps of:
- (a) providing a control signal from the control means to the second switch means so as to form an internal ring closed in the line concentrator;
- (b) transmitting a signal for diagnosis from the control means to the internal ring; and
- (c) according to a receive state of the signal, providing a control signal to change the configuration of the internal ring from the control means to the first switch means.

12. A diagnosis method according to claim 11 further comprising a step of supplying the control signal from the control means to each said first switch means to bypass all the ports, wherein the signal for diagnosis is transmitted to an internal ring including the control means and not including the other stations.

13. A diagnosis method according to claim 11 further comprising a step of supplying the control signal from the control means to the first switch means so as to connect one at a time a port to the internal ring and to bypass the other ports wherein, when the signal for analysis cannot completely circulate the internal ring, the port connected to the internal ring is assumed to be a failure port.

14. A diagnosis method according to claim 11 further comprising a step of supplying a signal for setting the internal ring to an interrupted state at a location of the switch from the control means to the first switch means.

15. A network system comprising:
   a plurality of line concentrators each having a plurality of ports for connecting stations;
   a first ring transmission line having a first signal transmission direction for connecting the line concentrators in a ring; and
   a second ring transmission line having a second signal transmission direction opposite to said first one for connecting the line concentrators in a ring;
   each of said line concentrators having
   a plurality of first switch means for selectively connecting the ports to the first ring transmission line or selectively bypassing the ports;
   second switch means for forming a loopback path between the first and second ring transmission lines at input or output portions of the line concentrator;
   third switch means for forming an internal ring closed in the line concentrator; and
   control means for selectively controlling the first, second and third switch means so as to form the internal ring, to change the state of the internal ring, to restore the internal ring or to form the loopback path.

16. A diagnosis method for a network system in which a plurality of line concentrators are connected by a first ring transmission line and a second ring transmission line, each of said line concentrators including a plurality of ports for connecting stations, a plurality of first switch means for selectively connecting the ports to the first ring transmission line or selectively bypassing the ports, a plurality of second switching means for changing the configuration of the network system, and means for controlling the first and second switch means, said diagnosis method comprising the steps of:
   (a) providing a control signal from the control means to the first and second switch means so as to form an internal ring closed in the line concentrator;
   (b) transmitting a signal for diagnosis from the control means to the internal ring;
   (c) providing a control signal from the control means to the second switch means so as to connect said internal ring with other line concentrators; and
   (d) transmitting a signal for diagnosis to the first ring transmission line while said internal ring is connected with other line concentrators.

17. A diagnosis method according to claim 16, wherein said internal ring is formed to bypass all the ports therefrom.

18. A diagnosis method according to claim 16, further comprising the step of:
   providing a control signal from the control means to the second switch means in accordance with the receive state of the diagnosis signal on the first ring transmission line.

19. A method for reconfiguration of a network system in which a plurality of line concentrators are connected by a first ring transmission line and a second ring transmission line, the first and second ring transmission lines each having a signal transmission direction opposite to each other and each said line concentrator including a plurality of ports for connecting stations, a plurality of first switch means for selectively connecting the ports to the first ring transmission line or selectively bypassing the ports, a plurality of second switching means for changing the configuration of the network system, and means for controlling the first and second switch means, said diagnosis method comprising the steps of:
   (a) providing a control signal from the control means to the first and secnd switch means so as to form an internal ring closed in the line concentrator;
   (b) transmitting a signal for diagnosis from the control means to the internal ring;
   (c) according to a receive state of the diagnosis signal, providing a control signal to change the configuration of the internal ring from the control means to the first switch means; and
   (d) according to a receive state of the diagnosis signal, providing a control signal to restore the internal ring from the control means to the second switch means.

20. A method according to claim 19 further comprising a step of supplying the control signal from the control means to each said first switch means to bypass all the ports, wherein the signal for diagnosis is transmitted to an internal ring including the control means and not including the other stations.

21. A method according to claim 19, further comprising the steps of:
   (e) supplying the control signal from the control means to the first switch means so as to connect one at a time a port to the internal ring and to bypass the other ports; and
   (f) supplying the control signal from the control means to the first switch means when the diagnosis signal cannot completely circulate the internal ring so as to connect all the ports to the internal ring without the port connected to the internal ring at the preceding step.

22. A network system comprising:
   a plurality of station means;
   a plurality of line concentrators each having a plurality of ports for connecting station means; and
   a pair of ring transmission lines, which transmit signals in opposite signal transmission directions relative to each other, for connecting the line concentrators;
   each of said line concentrators having
   (a) an internal line connectable to at least one of said ring transmission lines;
   (b) a plurality of first switch means for selectively connecting the ports to said internal line or selectively bypassing the ports;
   (c) second switch means for forming said internal line in an internal ring closed in the concentrator; and
   (d) control means for selectively controlling the first and second switch means so as to form the internal ring to change the state of the internal ring or to restore the internal ring.

23. A network system according to claim 22 wherein said control means includes means for transmitting a signal for diagnosis to said internal ring.

* * * * *